(12) United States Patent
Ma et al.

(10) Patent No.: US 11,404,052 B2
(45) Date of Patent: Aug. 2, 2022

(54) SERVICE DATA PROCESSING METHOD AND APPARATUS AND RELATED DEVICE

(71) Applicant: Tencent Technology (Shenzhen) Company Limited, Guangdong (CN)

(72) Inventors: Jinglin Ma, Shenzhen (CN); Xuewei Fang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 128 days.

(21) Appl. No.: 17/024,156

(22) Filed: Sep. 17, 2020

(65) Prior Publication Data

US 2021/0005185 A1 Jan. 7, 2021

Related U.S. Application Data

(63) Continuation of application No. PCT/CN2019/095464, filed on Jul. 10, 2019.

(30) Foreign Application Priority Data

Aug. 24, 2018 (CN) .......................... 201810973768.5

(51) Int. Cl.
*G10L 15/22* (2006.01)
*G10L 15/18* (2013.01)
*G10L 15/08* (2006.01)

(52) U.S. Cl.
CPC ........ *G10L 15/1815* (2013.01); *G10L 15/083* (2013.01); *G10L 15/22* (2013.01); *G10L 2015/223* (2013.01)

(58) Field of Classification Search
CPC ......... G10L 15/22; G10L 15/18; G10L 15/00; G10L 15/06; G10L 15/08; G10L 15/26;
(Continued)

(56) References Cited

U.S. PATENT DOCUMENTS 9,304,736 B1 4/2016 Whiteley et al.
2012/0197806 A1 8/2012 Hill
(Continued)

FOREIGN PATENT DOCUMENTS

CN 105072143 11/2015
CN 105744471 7/2016
(Continued)

OTHER PUBLICATIONS

Japanese Office Action dated Nov. 1, 2021 in Japanese Application No. 2020-560999 (with English Office Action Summary).
(Continued)

*Primary Examiner* — Qi Han
(74) *Attorney, Agent, or Firm* — ArentFox Schiff LLP

(57) ABSTRACT

In a service data processing method performed by a server, user speech information collected by a first terminal is received. A target service operation code according to the user speech information is obtained. The target service operation code is used for identifying target service operation information. The target service operation code is transmitted from the server to the first terminal, so that the first terminal plays the target service operation code by using a speech. The target service operation code obtained by a second terminal is received. A target execution page corresponding to the target service operation code is searched for. The target execution page is transmitted to the second terminal, so that the second terminal executes a service operation corresponding to the target.

20 Claims, 9 Drawing Sheets

(58) Field of Classification Search
CPC .................. G10L 15/28; G10L 15/30; G10L 2015/0631–0638; G10L 2015/221–228
USPC ............ 704/270.1, 270, 275, 273, 231, 251
See application file for complete search history.

(56) References Cited

U.S. PATENT DOCUMENTS

| | | | | |
|---|---|---|---|---|
| 2013/0041662 | A1* | 2/2013 | Sampathkumaran ... | G10L 15/26 704/235 |
| 2014/0082081 | A1 | 3/2014 | Ji et al. | |
| 2016/0055850 | A1* | 2/2016 | Nakadai .............. | G10L 15/32 704/235 |
| 2017/0374425 | A1* | 12/2017 | Disley ................ | G06F 3/147 |
| 2018/0247297 | A1* | 8/2018 | Misek ................ | G06Q 20/12 |

FOREIGN PATENT DOCUMENTS

| | | |
|---|---|---|
| CN | 107911386 | 4/2018 |
| CN | 108304153 | 7/2018 |
| CN | 109117235 | 1/2019 |
| JP | 2017-219951 | 12/2017 |
| JP | 2018-60043 | 4/2018 |
| WO | WO2017/029605 A1 | 2/2017 |
| WO | WO2018/131752 A1 | 7/2018 |
| WO | WO 2018/157721 A1 | 9/2018 |

OTHER PUBLICATIONS

Extended European Search Report dated Sep. 28, 2021 in European Application No. 19851979.5.
Communication Pursuant to Rules 70(2) and 70a(2) EPC dated Oct. 15, 2021 in European Application No. 19851979.5.
Auto-ID News!! Japan, Monthly Auto Recognition, vol. 30, No. 14, Japan Industrial Publishing Co., Ltd., 2017, 1 page.
International Search Report issued Sep. 30, 2019 in PCT Application No. PCT/CN2019/095464 (with English Translation).
Written Opinion dated Sep. 30, 2019 in PCT Application No. PCT/CN2019/095464.

* cited by examiner

SERVICE DATA PROCESSING METHOD AND APPARATUS AND RELATED DEVICE

RELATED APPLICATION

This application is a continuation of International Application No. PCT/CN2019/095464, filed on Jul. 10, 2019, which claims priority to Chinese Patent Application No. 201810973768.5, entitled "SERVICE DATA PROCESSING METHOD AND APPARATUS AND RELATED DEVICE" and filed on Aug. 24, 2018. The entire disclosures of the prior applications are hereby incorporated by reference in their entirety.

FIELD OF THE TECHNOLOGY

This application relates to the field of computer technologies including a service data processing method and apparatus and a related device.

BACKGROUND OF THE DISCLOSURE

With the popularity of smartphones and the mobile Internet, more offline interactions are gradually becoming online interactions. Because communication is migrating to online from offline, massive amounts of data are generated. Machine learning and other methods are used to process big data to assist people to achieve higher efficiency, or even replace people in some scenarios, thereby implementing a smart assistant. The smart assistant is a software application (App) or platform that understands natural language in speech or text form based on the artificial intelligence technology to meet user needs.

At present, most smart assistant products, for example, smart speakers or robots, are screenless products. Users can control such screenless products through speech to perform related operations. For example, a user instructs the smart speaker through speech to play a song. However, for a complex operation or a need to continue an original user experience of the user in screen use, a screened product (for example, a mobile phone or a tablet computer) is needed for assistance and support. For example, operations such as membership account opening, device binding, account login, and payment require the smart speaker to prompt the user to operate in an App on a mobile phone. The user needs to bind the App on the mobile phone to the smart speaker, and perform a corresponding operation in a specified menu in the App on the mobile phone, which results in a long operation path. Due to high learning costs of the user, it takes much time to complete a service operation function in the screened product.

SUMMARY

According to exemplary aspects, in a service data processing method performed by a server, user speech information collected by a first terminal is received. A target service operation code according to the user speech information is obtained. The target service operation code is used for identifying target service operation information. The target service operation code is transmitted from the server to the first terminal, so that the first terminal plays the target service operation code by using a speech. The target service operation code obtained by a second terminal is received. A target execution page corresponding to the target service operation code is searched for. The target execution page is transmitted to the second terminal, so that the second terminal executes a service operation corresponding to the target service operation information in the target execution page.

According to exemplary aspects, in a service data processing method performed by a first terminal, user speech information is obtained. A target service operation code according to the user speech information is obtained. The target service operation code is used for identifying target service operation information. The target service operation code is played by using a speech, so that a server searches for a target execution page corresponding to the target service operation code and transmits the target execution page to a second terminal. The target service operation code is collected by the second terminal and transmitted to the server, and the target execution page is a page in which the second terminal executes a service operation corresponding to the target service operation information.

According to exemplary aspects, a data processing apparatus includes circuitry that receives user speech information collected by a first terminal. The circuitry obtains a target service operation code according to the user speech information. The target service operation code is used for identifying target service operation information. The circuitry transmits the target service operation code to the first terminal, so that the first terminal plays the target service operation code by using a speech. The circuitry receives the target service operation code obtained by a second terminal, searches for a target execution page corresponding to the target service operation code, and transmits the target execution page to the second terminal, so that the second terminal executes a service operation corresponding to the target service operation information in the target execution page.

Counterpart non-transitory computer-readable medium embodiments of the above methods and apparatus are also contemplated.

BRIEF DESCRIPTION OF THE DRAWINGS

Referring now to the drawings, wherein like reference numerals designate identical or corresponding parts throughout the several views.

DETAILED DESCRIPTION

The following describes exemplary embodiments of the present disclosure with reference to the accompanying drawings. As can be appreciated, the exemplary embodiments are not exhaustive of all possible embodiments, and other embodiments and variations to the embodiments are possible without departing from the scope of the present disclosure.

Figure 1A:
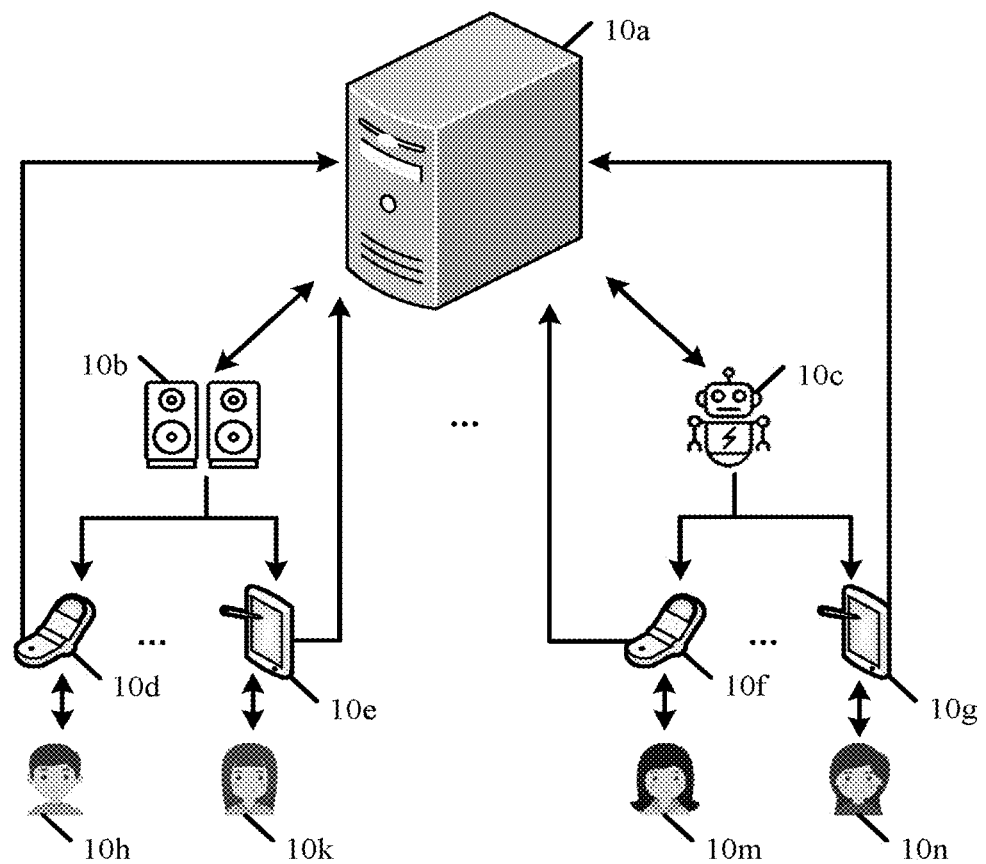
FIG. 1A is a diagram of a system architecture of a service data processing method according to exemplary embodiments of the present disclosure.

FIG. 1A is a diagram of a system architecture of a service data processing method according to an exemplary embodiment of the present disclosure. A server 10a (or referred to as a server device 10a) provides a corresponding service for a terminal device in a terminal device cluster. The terminal device cluster may include: a terminal device 10b, a terminal device 10c, a terminal device 10d, a terminal device 10e, a terminal device 10f, a terminal device 10g, and the like. The terminal device 10b and the terminal device 10c are screenless terminal devices or terminal devices without a character input function, referred to as first terminal devices (for example, a smart speaker, a smart robot, or other smart terminals without a display). The terminal device 10d, the terminal device 10e, the terminal device 10f, and the terminal device 10g are screened terminal devices with the character input function, referred to as second terminal devices (for example, a smartphone, a tablet computer, a portable computer, or other smart terminals with a display). A user (a user 10h, a user 10k, a user 10m, a user 10n, or the like) may transmit a user speech for indicating a service operation to a first terminal device. The service operation may be song playing, device binding, membership account opening, user login, instant messaging, news browsing, content displaying and playing, or the like. To enable a second terminal device to assist the first terminal device in completing the service operation, the first terminal device transmits the received user speech to the server 10a. The server 10a recognizes the service operation indicated by the user speech, and searches a database for a service operation code corresponding to the service operation. The server 10a transmits a found service operation code to the first terminal device. The first terminal device plays the service operation code by using a speech. The second terminal device collects the speech including the service operation code and played by the first terminal device, that is, a screenless terminal device, and transmits the speech to the server 10a. The server extracts the service operation code in the speech, searches for an execution page corresponding to the service operation code, and transmits the execution page to the second terminal device. The second terminal device may execute a corresponding service operation in the execution page, to assist the first terminal device in completing the service operation. Certainly, the user speech may alternatively be recognized by the first terminal device to determine the service operation code, instead of by the server that transmits the service operation code to the screenless terminal device after determining the service operation code. Subsequently, the first terminal device may play the speech including the service operation code.

Figure 1B:
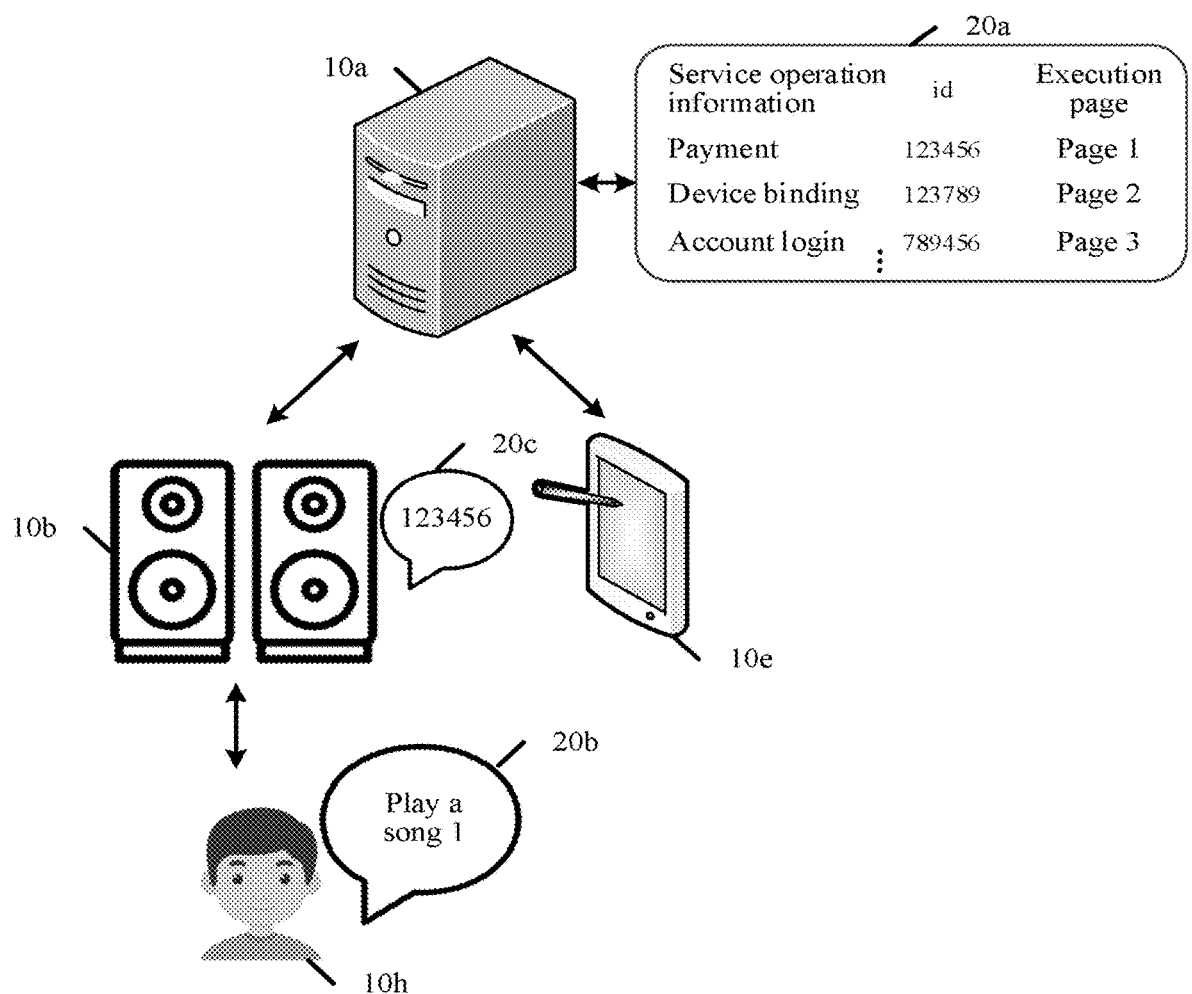
FIG. 1B is a schematic scenario diagram of a service data processing method according to exemplary embodiments of the present disclosure.

The following describes how a screenless terminal device efficiently completes a service operation with reference to FIG. 1B by using the server 10a, one first terminal device (the terminal device 10b), one second terminal device (the terminal device 10e), and the user 10h as an example.

The user 10h transmits a speech 20b, for example, "play a song 1", to the terminal device 10b. The terminal device 10b transmits the collected speech 20b to the server 10a. The server 10a performs a semantic analysis on the speech 20b, processes the speech 20b by using service logic of a domain service, and then determines that the song 1 is a pay song and a payment amount is 3 yuan. In this case, service operation information corresponding to the speech 20b is payment. The server 10a searches a table 20a for a service operation code (ID), for example, 123456, corresponding to the service operation information "payment". A service parameter of a current service operation includes the payment amount 3 yuan. The service operation code may be preset in the table 20a. Alternatively, the server 10a may generate a random number in real time, detect whether the random number is the same as any service operation code in the table 20a, and set a mapping relationship for the generated random number and the service operation information "payment" if the random number is different from all service operation codes in the table 20a. Regardless of whether the service operation code is preset or generated in real time, a mapping relationship between the service operation information and an execution page needs to be preset in the table 20a. The server 10a transmits the service operation code "123456" to the terminal device 10b after determining the service operation code. The terminal device 10b generates a speech 20c including the service operation code, and plays the speech 20c. The terminal device 10e collects the speech 20c played by the terminal device 10b, and transmits the speech 20c to the server 10a, so that the server 10a extracts the service operation code "123456" in the speech 20c. Certainly, alternatively, the user 10h may manually enter the service operation code included in the speech 20c on the terminal device 10e after hearing the speech 20c, and then the terminal device 10e transmits the service operation code to the server 10a. After obtaining the service operation code, the server 10a searches the table 20a for an execution page, for example, a page 1, corresponding to the service operation code "123456". A payment parameter corresponding to the page 1 is 3 yuan. In other words, the page 1 is a payment page. The server 10a transmits the page 1 to the terminal device 10e. The terminal device 10e executes a payment operation in the page 1. After the payment is completed, the terminal device 10e may transmit a payment success message to the server 10a. After obtaining the payment success message, the server 10a instructs the terminal device 10b to play the song 1.

When the terminal device 10e assists the terminal device 10b in completing the service operation, device binding is unnecessary between the two terminal devices, which saves a device binding operation between the terminal device 10b and the terminal device 10e, thereby improving efficiency of the terminal device 10b and the terminal device 10e in completing the service operation. In addition, with the service operation code, the terminal device 10e may directly display the corresponding execution page (for example, the payment page 1) to the user, so that the user does not need to manually search for the execution page, which further improves the efficiency of the terminal device 10b and the terminal device 10e in completing the service operation.

For specific processes of obtaining a service operation code, searching for a service operation code, and searching for an execution page, reference may be made to the following exemplary embodiments corresponding to FIG. 2 to FIG. 4B.

Figure 2:
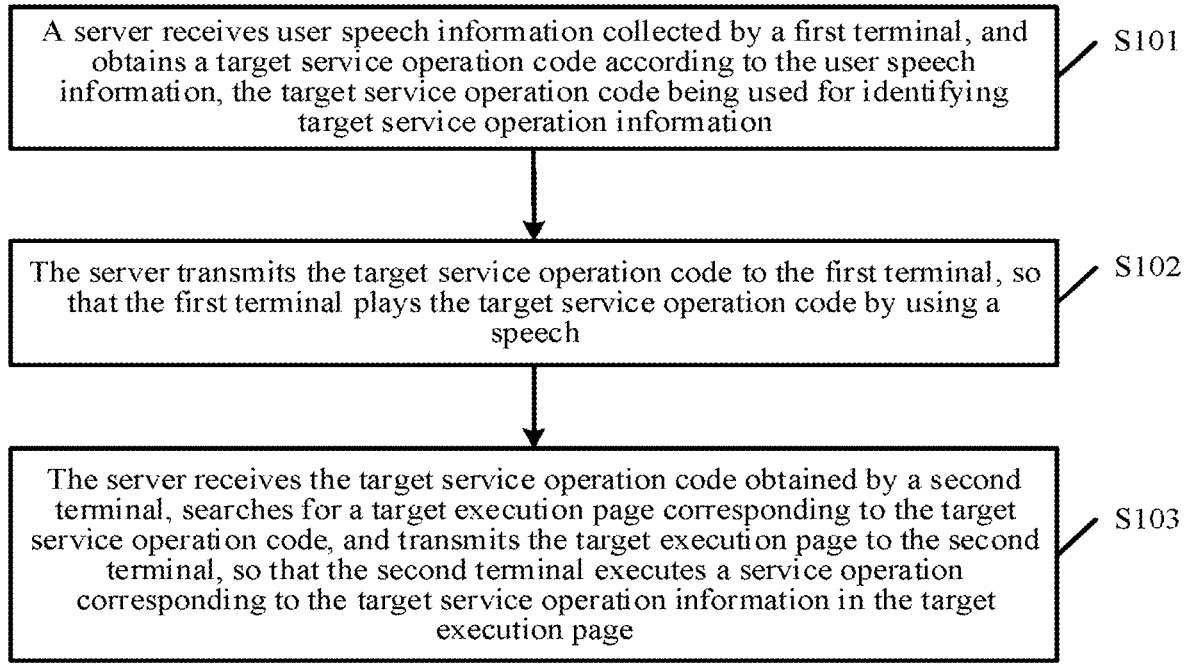
FIG. 2 is a schematic flowchart of a service data processing method according to exemplary embodiments of the present disclosure.

Further, FIG. 2 is a schematic flowchart of a service data processing method according to an exemplary embodiment of the present disclosure. As shown in FIG. 2, the service data processing method may include the following steps:

In step S101, a server receives user speech information collected by a first terminal, and obtains a target service operation code according to the user speech information. The target service operation code is used for identifying target service operation information.

Specifically, a server (for example, the server 10a in FIG. 1B) receives user speech information (for example, the speech 20b in FIG. 1B) collected and transmitted by a first terminal (for example, the terminal device 10b in FIG. 1B). The first terminal is a screenless terminal or a terminal device without a character input function, but the first terminal can receive speech information. The user speech information may further carry parameter information of the first terminal, for example, a device model of the first terminal or a unique identifier of the first terminal. The server performs a semantic recognition on the user speech information, to understand a user's intention recorded in the user speech information and obtain corresponding service operation information (for example, device binding, membership account login, or recharge), referred to as target service operation information, and determines a service parameter (for example, a specific payment amount or a specific to-be-played song, where the service parameter may or may not exist depending on different types of service operation information) corresponding to the target service operation information.

A semantic recognition process may be as follows: The user speech information is first converted into a text. The text is then divided into a plurality of phrases through word segmentation. A probability of each phrase being a key word is calculated. A phrase with a higher probability is used as a key word of the text. The target service operation information corresponding to the user speech information may be recognized according to the key word of the text. It is converting a speech into a text and recognizing service operation information corresponding to the text, and belongs to natural language processing. Certainly, alternatively, the user speech information may be directly recognized based on such a method as an acoustic model, a language model, or a hidden Markov model in a speech recognition technology, to obtain the target service operation information corresponding to the user speech information. After determining the target service operation information, the server searches a table (for example, the table 20a in FIG. 1B) in a corresponding database for a service operation code corresponding to the target service operation information. The service operation code is referred to as a target service operation code. The service operation code may be represented by a digit, a letter, or a combination thereof. The service operation code is unique and exclusive, and a length of the service operation code may or may not be fixed, which is not limited in this application. After finding the target service operation code, the server may set a correspondence for the parameter information of the first terminal, the target service operation code, the target service operation information, and the service parameter. In other words, the target service operation information corresponds to the parameter information of the first terminal, and also corresponds to the target service operation code and the service parameter. Herein, the service operation code and the service operation information are preset in the database, and the parameter information of the first terminal and the service parameter are generated in real time according to the user speech. When a service operation code is set, a corresponding validity period needs to be set for each service operation code. When the service operation code is beyond the validity period, the validity period needs to be reset in the database for the service operation code.

In the foregoing description, the service operation code is preset in the database, and subsequently, the target service operation code corresponding to the target service operation information may be directly found. Alternatively, after the server semantically understands the user speech information and obtains the target service operation information, the server may randomly generate a random number. If the generated random number is different from all service operation codes existing in the database, the server may use the generated random number as a target service operation code, and sets a mapping relationship for the target service operation code, the target service operation information, the parameter information of the first terminal, the service parameter, and the like. In addition, the server also sets a validity period for the random number (the target service operation code). Certainly, if the generated random number is the same as a service operation code existing in the database, to ensure uniqueness of the service operation code, the server deletes the random number, re-generates a random number, and re-determines whether the re-generated random number is the same as a service operation code existing in the database.

Regardless of whether the service operation code is generated in advance or in real time, the service operation information and an execution page (the execution page is stored by using a HyperText Transfer Protocol (HTTP) address, and a uniform resource locator (URL) of a resource involved in the page is also stored) corresponding to the service operation information are preset in the database. In other words, after the server determines the target service operation code, there are target service operation information, an execution page, parameter information of the first terminal, a service parameter, and the like corresponding to each target service operation code.

In step S102, the server transmits the target service operation code to the first terminal, so that the first terminal plays the target service operation code by using a speech.

Specifically, the server transmits the target service operation code to the first terminal, so that the first terminal encapsulates a preset play prefix and the target service operation code into a speech (referred to as a target speech) based on a preset speech template, and plays the target speech. The target speech may further carry the parameter information of the first terminal. For example, the target speech may be "please use your mobile phone's sound receiver to collect the service operation code 123456", or "please use your mobile phone's sound receiver to collect the following 6-digit service operation code 123456", the value "123456" being the target service operation code. The "please use your mobile phone's sound receiver to collect the service operation code" or "please use your mobile phone's sound receiver to collect the following 6-digit service operation code" is a preset play prefix.

In step S103, the server receives the target service operation code obtained by a second terminal, searches for a target execution page corresponding to the target service operation code, and transmits the target execution page to the second terminal, so that the second terminal executes a service operation corresponding to the target service operation information in the target execution page.

Specifically, the server receives the target speech collected and transmitted by the second terminal (for example, the terminal device 10e in FIG. 1B). The second terminal is a screened terminal device with the character input function (for example, a mobile phone, a tablet computer, or a notebook computer). The server converts the target speech into a text, extracts a number in the text, that is, extracts the target service operation code in the text. Alternatively, the server directly semantically understands the target speech, and extracts the target service operation code in the target speech. Alternatively, the server receives the target service operation code directly transmitted by the second terminal (that is, the second terminal transmits, to the server, the target service operation code rather than the target speech including the target service operation code). The target service operation code is entered by the user on the second terminal. After obtaining the target service operation code, the server searches the table in the database for an execution page corresponding to the target service operation code. The execution page corresponding to the target service operation code is referred to as a target execution page. Further, the server may verify whether the parameter information of the first terminal in the target speech is the same as the parameter information of the first terminal that is stored in the server and corresponding to the target service operation code. If the two are the same, it indicates that the target speech is valid, and subsequently, the server may transmit the target execution page to the second terminal (if the two are different, it indicates that the target speech is invalid, and the server may end a current service operation, and transmit a prompt notification to the user). After receiving the target execution page, the second terminal executes a service operation corresponding to the target service operation information in the target execution page. For example, if the target service operation information is payment, the target execution page is a payment page, and the second terminal obtains, in the payment page, a bank card number and a password that are entered by the user for the payment. If there is a service parameter (for example, a payment amount), and the service parameter corresponds to the target execution page, both the target execution page and the service parameter are transmitted to the second terminal, so that the second terminal executes the service operation in the target execution page according to the service parameter.

For subsequent verification on the validity period of the target service operation code, after determining the target service operation code, the server sets a generation timestamp for the target service operation code, the generation timestamp being a timestamp when the target service operation code is determined, and associatively stores the generation timestamp, the target service operation information, the target service operation code, the corresponding execution page, and the like in the database. Subsequently, when extracting the target service operation code from the target speech, the server obtains an extraction timestamp, the extraction timestamp being a timestamp when the server extracts the target service operation code from the target speech. The server searches the database for the generation timestamp of the target service operation code, and calculates an interval between the generation timestamp and the extraction timestamp. If the interval is within a preset interval range, it indicates that the target service operation code is within the validity period. Otherwise, it indicates that the target service operation code is beyond the validity period. The preset interval range may be specifically determined according to a speed of the server in processing the target speech. If the target service operation code is within the validity period, the server searches the table in the database for the target execution page corresponding to the target service operation code, and transmits the target execution page to the second terminal. The second terminal executes the service operation corresponding to the target service operation information in the target execution page. If the target service operation code is beyond the validity period, the server transmits a verification failure message to the second terminal. The verification failure message may be transmitted to the second terminal by using a text or a speech. For example, the verification failure message may be "your operation code is expired, please obtain an operation code again".

Further, to prevent the target service operation code from being intercepted by others, some service operations (for example, account login and device binding) involving user information requires secondary verification. The server receives confirmation speech information collected and transmitted by the first terminal. The confirmation speech information is transmitted by the user. The server extracts a key word in the confirmation speech information, and generates a behavior confirmation message according to the key word. For example, the confirmation speech information may be "I agree the device binding", and the server generates a behavior confirmation message "agree" according to the confirmation speech information. If the behavior confirmation message is the same as any preset target confirmation message (for example, the target confirmation message may include characters such as "confirm", "agree", "OK", "all right", "sure", and "yes" representing an agreement), subsequently, the server may search the table in the database for the target execution page corresponding to the target service operation code, and transmits the target execution page to the second terminal. The second terminal executes the service operation corresponding to the target service operation information in the target execution page. If the behavior confirmation message is different from all target confirmation messages, the server transmits a verification failure message to the second terminal. For example, the verification failure message may be "the verification fails, please try again".

The second terminal may transmit a service completion message to the server after completing the service operation corresponding to the target service operation information. The server forwards the service completion message and the service parameter (the service parameter indicates the to-be-played song) to the first terminal, so that after receiving the service completion message and the service parameter, the first terminal executes a service operation indicated by the user speech information. For example, if the user speech information is "play a song A", and the song is a pay song, the target service operation information is payment. After the second terminal transmits a service completion message to the server (that is, the payment is completed), the server forwards the service completion message and a corresponding service parameter (the song A) to the first terminal. The first terminal plays the song A according to the service parameter after receiving the message.

Figure 3:
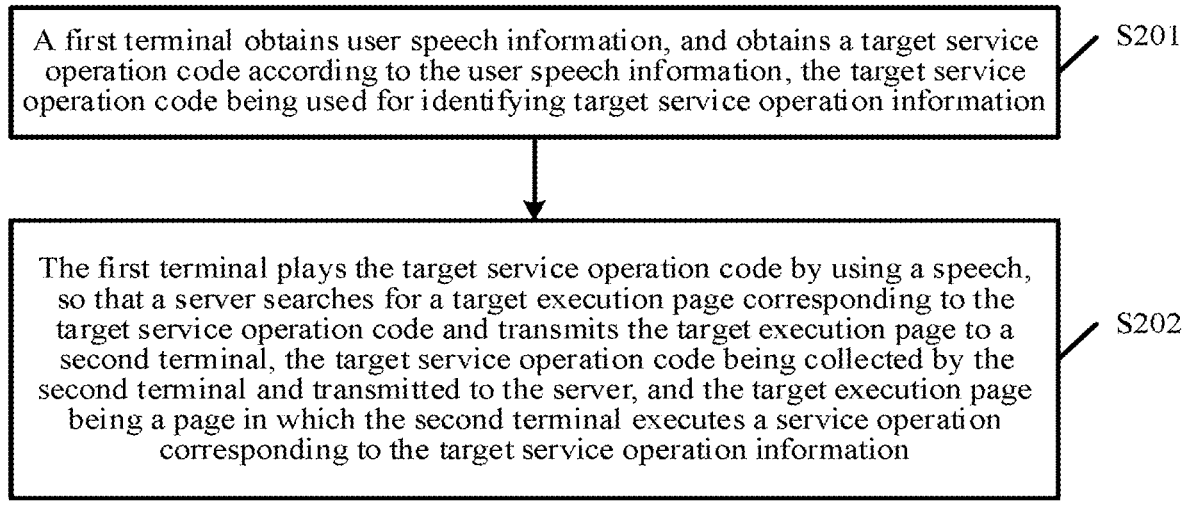
FIG. 3 is a schematic flowchart of another service data processing method according to exemplary embodiments of the present disclosure.

FIG. 3 is a schematic flowchart of another service data processing method according to an exemplary embodiment of the present disclosure. The service data processing method may include the following steps:

In step S201, a first terminal obtains user speech information, and obtains a target service operation code according to the user speech information, the target service operation code being used for identifying target service operation information.

Specifically, a first terminal obtains user speech information transmitted by a user, and obtains a target service operation code corresponding to the user speech information. The target service operation code may be determined and obtained by the first terminal, or may be determined by a server and transmitted to the first terminal, so that the first terminal obtains the target service operation code.

When the first terminal determines the target service operation code, the first terminal performs a semantic recognition on the user speech information, to understand the user's intention in the user speech information and obtain corresponding service operation information (for example, device binding, membership account login, or recharge), referred to as target service operation information, and determines a service parameter corresponding to the target service operation information. A semantic recognition process may be as follows: The user speech information is first converted into a text. The text is then divided into a plurality of phrases through word segmentation. A probability of each phrase being a key word is calculated. A phrase with a higher probability is used as a key word of the text. The target service operation information corresponding to the user speech information may be recognized according to the key word of the text. Certainly, alternatively, the user speech information may be directly recognized based on such a method as an acoustic model, a language model, or a hidden Markov model in a speech recognition technology, to obtain the target service operation information corresponding to the user speech information. The first terminal searches for a service operation code corresponding to the target service operation information, determines a found service operation code as the target service operation code corresponding to the target service operation information, and sets a correspondence for the target service operation code and the service parameter. It can be learned from above that the first terminal pre-stores a table, and the table records a plurality of pieces of service operation information and a service operation code corresponding to each piece of service operation information.

When the server determines the target service operation code, the first terminal detects a network status according to the user speech information. For example, the first terminal transmits the user speech information to the server. If no acknowledgment returned by the server is received within a preset time period, it indicates that the first terminal is in a network disconnected state. If an acknowledgment returned by the server is received within the preset time period, it indicates that the first terminal is in a network connected state. When the first terminal is in the network connected state, the first terminal transmits the user speech information to the server, so that the server performs a semantic recognition on the user speech information, to obtain the target service operation information, and the server determines the target service operation code according to the target service operation information. The service operation code may be pre-stored in the server, or the server generates a service operation code in real time. For a specific process of determining the target service operation code by the server, reference may be made to step S101 in FIG. 2. The first terminal receives the target service operation code transmitted by the server. When the first terminal is in the network disconnected state, the first terminal locally searches for a service operation code for network connection (the service operation code for network connection is set in the first terminal before delivery, and in any case in the network disconnected state, the first terminal locally searches for the service operation code for network connection), and determines the service operation code for network connection as the target service operation code. With respect to the service operation code corresponding to the user speech information, after the first terminal is connected to a network, the first terminal may retransmit the user speech information to the server to obtain the corresponding service operation code, or prompt the user to re-input the user speech information.

In step S202, the first terminal plays the target service operation code by using a speech, so that a server searches for a target execution page corresponding to the target service operation code and transmits the target execution page to a second terminal, the target service operation code being collected by the second terminal and transmitted to the server, and the target execution page being a page in which the second terminal executes a service operation corresponding to the target service operation information.

Specifically, the first terminal generates a target speech according to a preset speech prefix and the target service operation code, and plays the target speech. The second terminal collects the target speech by using a sound receiver, and transmits the target speech to the server. The server extracts the target service operation code in the target speech, and searches for an execution page corresponding to the target service operation code as a target execution page. Alternatively, the second terminal obtains the target service operation code entered by the user, and directly transmits the target service operation code to the server. The server still needs to search for the target execution page corresponding to the target service operation code, though the second terminal transmits, to the server, the target service operation code rather than the target speech including the target service operation code. The server transmits the found target execution page to the second terminal. The second terminal executes a service operation (for example, payment, device binding, or membership account login) corresponding to the target service operation information in the target execution page. Further, to improve security, the target service operation code in the target speech may be converted into an encrypted sound wave, and only particular Apps or software can recognize and obtain the target service operation code in the target speech. When the first terminal determines the target service operation code, the first terminal stores a table, and the table records a plurality of pieces of service operation information and a service operation code (including a service operation code for network connection) corresponding to each piece of service operation information. In addition, the server also stores, in a corresponding database, a table with the same content as the foregoing table, and the table in the server not only includes service operation information and service operation codes, but also stores an execution page corresponding to each service operation code. The table in the first terminal may or may not store the execution page corresponding to the service operation code.

When the target service operation information (for example, user login or membership account login) involves user information, the target service operation information requires secondary verification. To be specific, the first terminal prompts the user to transmit confirmation speech information. For example, the first terminal plays a speech "are you sure to perform membership account login", and the user answers "sure". The first terminal collects the confirmation speech information of the user (a speech corresponding to the "sure" is the confirmation speech information). The first terminal transmits the collected confirmation speech information to the server. The server extracts a key word in the confirmation speech information, and generates a behavior confirmation message according to the key word. For example, the confirmation speech information may be "1 agree the device binding", and the server generates a behavior confirmation message "agree" according to the confirmation speech information. If the behavior confirmation message is the same as any preset target confirmation message (for example, the target confirmation message may include characters such as "confirm", "agree", "OK", "all right", "sure", and "yes" representing an agreement), the server may search the table in the database for the target execution page corresponding to the target service operation code, and transmits the target execution page to the second terminal. The second terminal executes the service operation corresponding to the target service operation information in the target execution page. If the behavior confirmation message is different from all target confirmation messages, the server transmits a verification failure message to the second terminal. For example, the verification failure message may be "the verification fails, please try again".

Figure 4A:
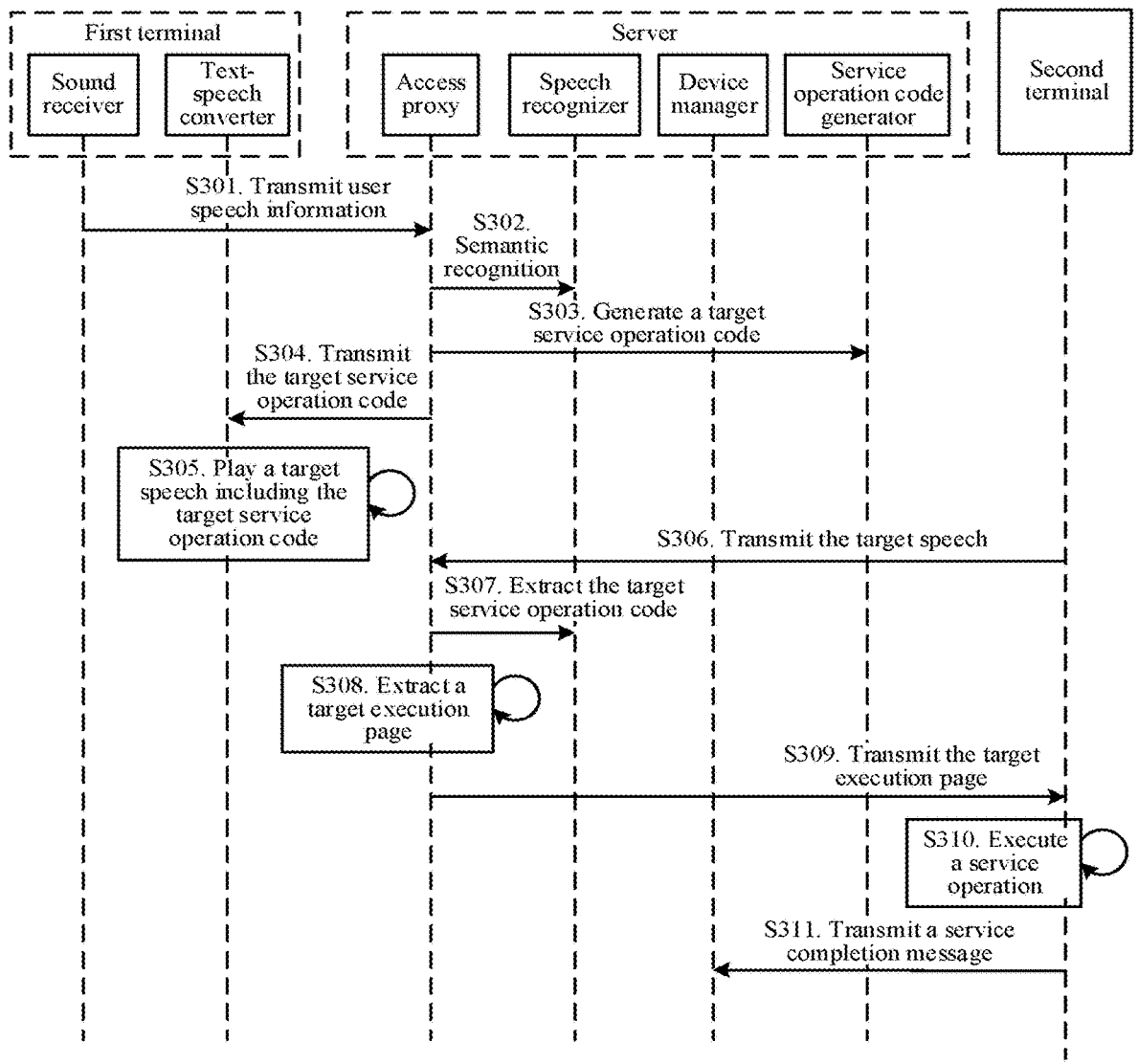
FIG. 4A is a schematic interaction diagram of a service data processing method according to exemplary embodiments of the present disclosure.

FIG. 4A is a schematic interaction diagram of a service data processing method according to an exemplary embodiment of the present disclosure. The service data processing method involves a first terminal, a second terminal, and a server. The first terminal is a screenless terminal device or a terminal device without a character input function. The second terminal is a screened terminal device with the character input function. In other words, the second terminal assists the first terminal in completing a service operation. The first terminal includes a sound receiver and a text-speech converter. The server includes an access proxy, a speech recognizer, a device manager, and a service operation code generator. The service data processing method may include the following steps:

In step S301, the sound receiver collects user speech information, and transmits the user speech information to the access proxy.

Specifically, a user transmits user speech information, for example, "log in to a membership account of a music App", to the first terminal. The sound receiver in the first terminal collects the user speech information, and transmits the user speech information to the access proxy in the server.

In step S302, the speech recognizer recognizes the user speech information, to obtain target service operation information corresponding to the user speech information.

Specifically, the access proxy in the server invokes the speech recognizer, to understand the user's intention and obtain service operation information corresponding to the user speech information, referred to as target service operation information, and determines a service parameter (the service parameter may or may not exist depending on different types of service operation information) corresponding to the target service operation information. For a specific working process of the speech recognizer, reference may be made to step S101 in the exemplary embodiment corresponding to FIG. 2.

In step S303, the service operation code generator generates a target service operation code corresponding to the target service operation information.

Specifically, the access proxy invokes the service operation code generator to search the server for a service operation code corresponding to the target service operation information, referred to as a target service operation code. Certainly, alternatively, the access proxy may invoke the service operation code generator to randomly generate a random number, determine the random number as a target service operation code, and set a mapping relationship for the random number and the target service operation information. For a specific process of searching for the target service operation code or generating the target service operation code in real time by the service operation code generator, reference may be made to step S101 in the exemplary embodiment corresponding to FIG. 2.

In step S304, the access proxy transmits the target service operation code.

Specifically, the access proxy in the server transmits the determined service operation code to the text-speech converter in the first terminal.

In step S305, the text-speech converter generates a target speech including the target service operation code.

The text-speech converter in the first terminal generates the target speech according to the target service operation code and a play prefix. In other words, the target speech includes both the target service operation code and the play prefix.

In step S306, the second terminal collects the target speech, and transmits the target speech to the access proxy.

Specifically, a sound receiver in the second terminal may collect the target speech played by the first terminal, and the second terminal transmits the collected target speech to the access proxy in the server. Alternatively, the second terminal may directly obtain the target service operation code entered by the user, and directly transmit the obtained target service operation code to the access proxy in the server.

In step S307, the speech recognizer extracts the target service operation code in the target speech.

Specifically, if the second terminal transmits the target speech to the server, the access proxy in the server further needs to invoke the speech recognizer to recognize the target service operation code in the target speech. Certainly, if the second terminal transmits the target service operation code to the server, the server may directly receive the target service operation code.

In step S308, the access proxy searches for a target execution page corresponding to the target service operation code.

Specifically, the access proxy searches a database corresponding to the server for an execution page corresponding to the target service operation code, referred to as a target execution page. The execution page is stored in the database corresponding to the server by using an HTTP address.

In step S309, the access proxy transmits the target execution page to the second terminal.

Specifically, the access proxy in the server transmits the found target execution page to the second terminal, so that the second terminal directly displays the target execution page on a screen. If there is a service parameter (for example, a payment amount), and the service parameter corresponds to the target execution page, the access proxy transmits both the target execution page and the service parameter to the second terminal, so that the second terminal executes a service operation in the target execution page according to the service parameter.

In step S310, the second terminal executes a service operation in the target execution page.

The second terminal executes the service operation in the target execution page, that is, the second terminal assists the first terminal in completing a service operation.

In step S311, the second terminal transmits a service completion message to the device manager.

Specifically, the second terminal transmits the service completion message to the device manager in the server.

After receiving the service completion message, the device manager may execute a corresponding operation according to specific content involved in the target service operation information. For example, when the target service operation information involves a device binding operation between the first terminal and the second terminal, the device manager may set a binding correspondence between the first terminal and the second terminal according to the service completion message. When the target service operation information involves playing a pay song, the device manager may transmit, to the first terminal according to the service completion message, an instruction for playing the pay song.

Figure 4B:
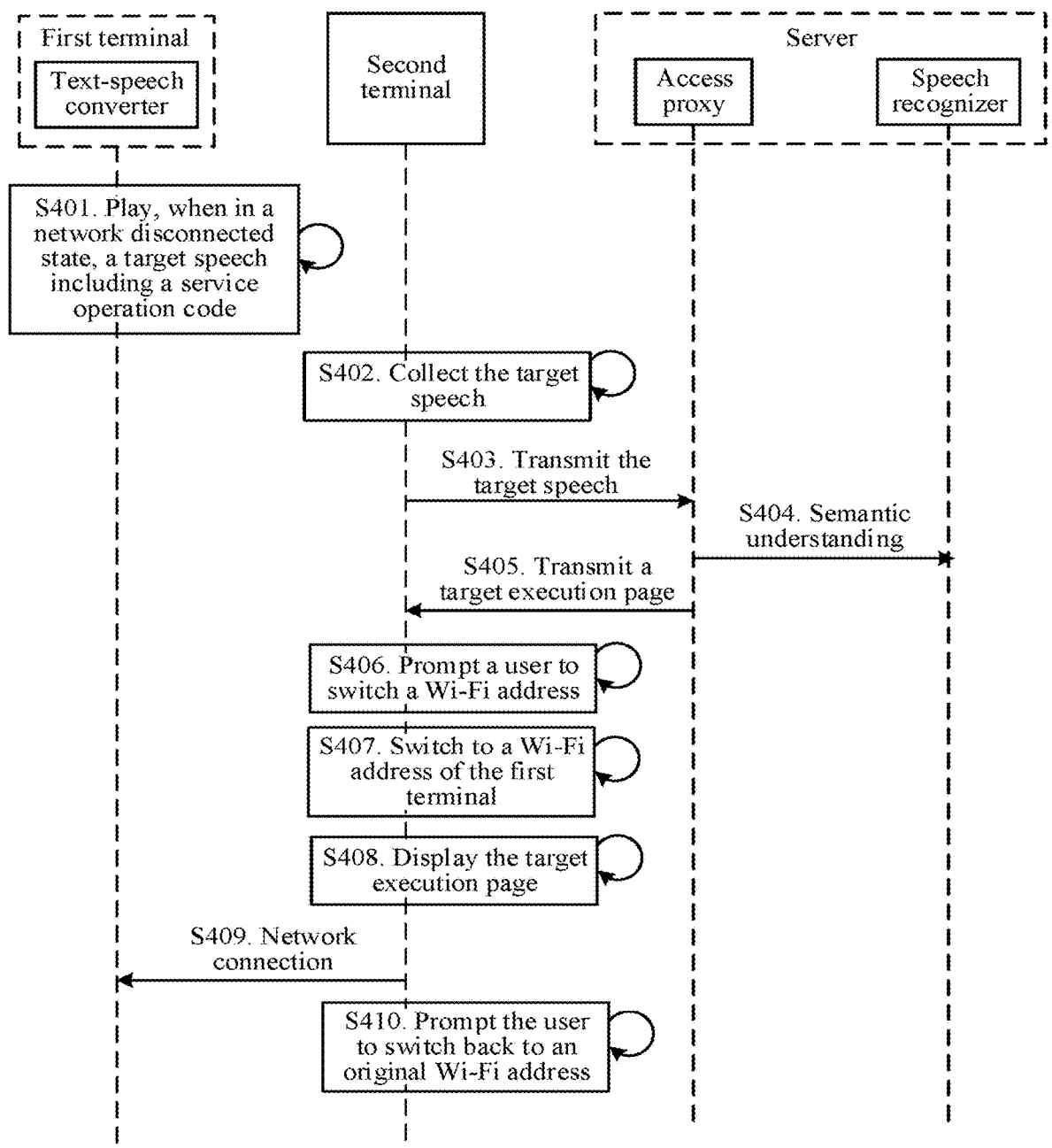
FIG. 4B is a schematic interaction diagram of another service data processing method according to exemplary embodiments of the present disclosure.

FIG. 4B is a schematic interaction diagram of another service data processing method according to an exemplary embodiment of the present disclosure. The service data processing method is performed in a case that a first terminal is in a network disconnected state, and the first terminal pre-stores a service operation code for network connection. In other words, a service operation to be executed by the first terminal is network connection. The first terminal is a screenless terminal device or a terminal device without a character input function. A second terminal is a screened terminal device with the character input function. In other words, the second terminal assists the first terminal with network connection. The first terminal includes a text-speech converter. A server includes an access proxy and a speech recognizer. The service data processing method may include the following steps:

In step S401, the first terminal plays, when in the network disconnected state, a target speech including a service operation code.

Specifically, the first terminal randomly transmits a message to the server. If no acknowledgment returned by the server is received within a preset time period, it indicates that the first terminal is in the network disconnected state. When the first terminal is in the network disconnected state, the first terminal locally searches for the preset service operation code for network connection. The text-speech converter generates a target speech according to the service operation code and a preset play prefix. The first terminal plays the target speech.

In step S402, the second terminal collects the target speech.

Specifically, a sound receiver in the second terminal collects the target speech played by the first terminal. The first terminal does not directionally play the target speech to the second terminal, but directly plays the target speech without a target object. Any device with a sound receiver function may collect the target speech. In other words, there may be no binding correspondence between the first terminal and the second terminal.

In step S403, the second terminal transmits the target speech to the access proxy.

Specifically, the second terminal transmits the collected target speech to the access proxy in the server.

In step S404, the speech recognizer semantically understands the target speech, to obtain the service operation code.

Specifically, the access proxy invokes the speech recognizer to semantically understand the target speech, to extract the service operation code that is included in the target speech and used for network connection.

Because the target speech is directly played by the first terminal, a user may also hear the target speech, and the user may directly enter, on the second terminal, the service operation code that is in the target speech and used for network connection. The second terminal transmits the service operation code to the server after obtaining the service operation code.

In step S405, the access proxy searches for a target execution page corresponding to the service operation code, and transmits the target execution page to the second terminal.

Specifically, the access proxy searches a database corresponding to the server for an execution page corresponding to the service operation code (the service operation code for network connection). A found execution page is referred to as a target execution page. The access proxy transmits the target execution page to the second terminal. It can be learned from above that the database corresponding to the server pre-stores the service operation code (the service operation code for network connection) and the execution page (a network setting page) corresponding to the service operation code.

In step S406, the second terminal displays a first switching prompt message.

Specifically, to guide the user to connect to a network of the first terminal, the first switching prompt message may be displayed on a screen of the second terminal, to prompt the user to switch a current Wi-Fi address of the second terminal to a Wi-Fi address of the first terminal, so that the second terminal assists the first terminal with network connection.

In the S407, a Wi-Fi address of the second terminal is switched to a Wi-Fi address of the first terminal.

Specifically, the user clicks/taps a "switch" button in the second terminal, and the second terminal generates a switching instruction. The switching instruction is used for instructing the second terminal to switch the current Wi-Fi address of the second terminal to the Wi-Fi address of the first terminal. It can be learned from above that, the first terminal is a terminal device that can transmit a Wi-Fi signal.

In step S408, the target execution page is displayed.

Specifically, after detecting that the current Wi-Fi address is the Wi-Fi address of the first terminal, the second terminal displays the target execution page on the screen of the second terminal.

In step S409, the first terminal connects to a network.

Specifically, the user selects an available network in the second terminal, and enters a password corresponding to the network to connect the first terminal to the network, that is, the first terminal is in a network connected state. Because the second terminal currently assists the first terminal with network connection, a purpose of all such operations performed by the second terminal as obtaining the network selected by the user and the password entered by the user is to connect the first terminal to the network.

In step S410, the second terminal displays a second switching prompt message.

Specifically, to guide the user to switch from the Wi-Fi address of the first terminal back to the original Wi-Fi address, the second switching prompt message may be displayed on the screen of the second terminal, to prompt the user to switch the current Wi-Fi address (the current Wi-Fi address is the Wi-Fi address of the first terminal) of the second terminal to the original Wi-Fi address of the second terminal.

Figure 5:
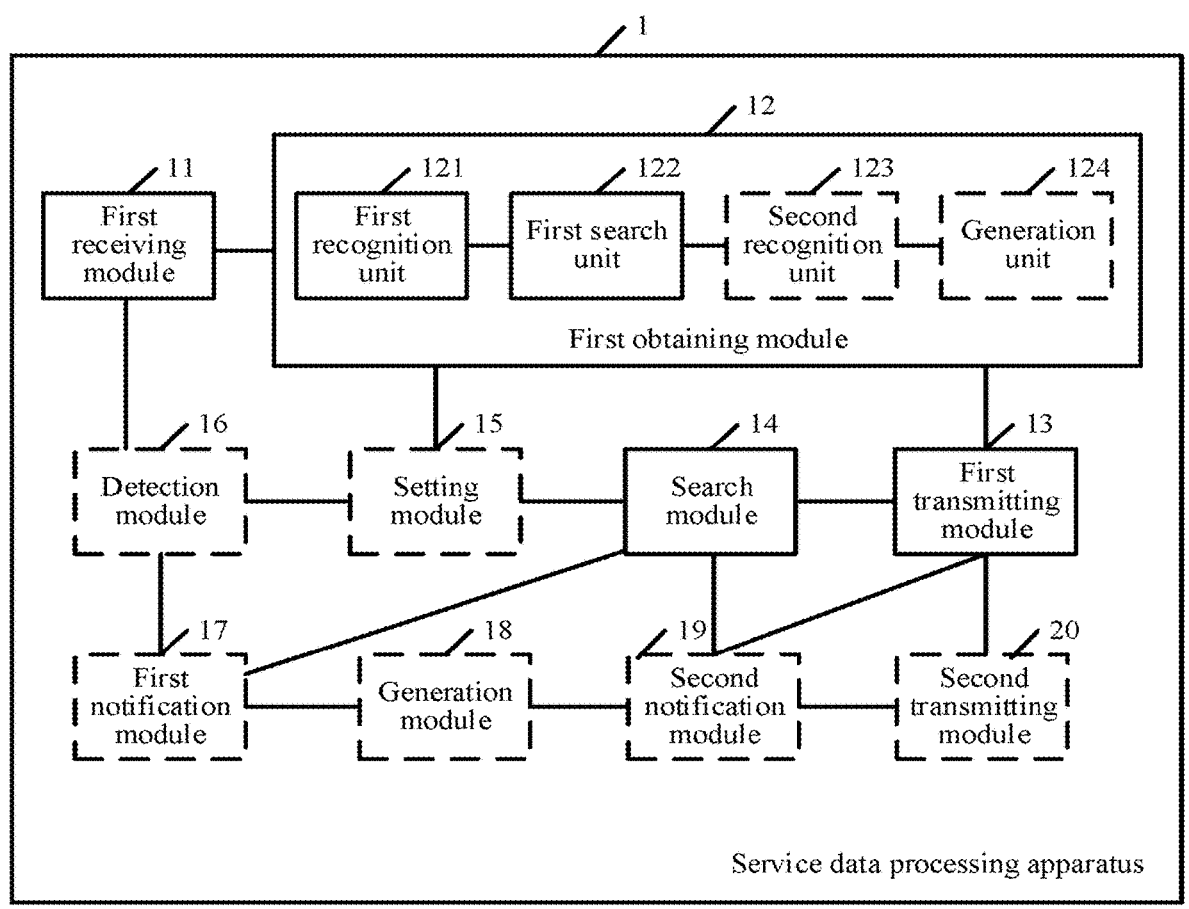
FIG. 5 is a schematic structural diagram of a service data processing apparatus according to exemplary embodiments of the present disclosure.

Further, FIG. 5 is a schematic structural diagram of a service data processing apparatus according to an exemplary embodiment of the present disclosure. The service data processing apparatus may be applied to the server in the exemplary embodiment corresponding to FIG. 2. As shown in FIG. 5, the service data processing apparatus 1 may include a first receiving module 11, a first obtaining module

12, a first transmitting module 13, and a search module 14. As one of ordinary skill in the art will recognize, the modules included in the service data processing apparatus may be implemented by circuitry that is configured to perform the corresponding functions of the modules.

The first receiving module 11 is configured to receive user speech information collected by a first terminal.

Specifically, the first receiving module 11 receives user speech information collected and transmitted by a first terminal. The first terminal is a screenless terminal or a terminal device without a character input function, but the first terminal can receive speech information. The user speech information may further carry parameter information of the first terminal, for example, a device model of the first terminal or a unique identifier of the first terminal.

The first obtaining module 12 is configured to obtain a target service operation code according to the user speech information, the target service operation code being used for identifying target service operation information.

Specifically, the first obtaining module 12 performs a semantic recognition on the user speech information, to understand a user's intention recorded in the user speech information and obtain corresponding service operation information (for example, device binding, membership account login, or recharge), referred to as target service operation information. The first obtaining module 12 determines a service parameter corresponding to the target service operation information.

After determining the target service operation information, the first obtaining module 12 searches a table in a database for a service operation code corresponding to the target service operation information. The service operation code is referred to as a target service operation code. After finding the target service operation code, the first obtaining module 12 may set a correspondence for the parameter information of the first terminal, the target service operation code, the target service operation information, and the service parameter. In other words, the target service operation information corresponds to the parameter information of the first terminal, and also corresponds to the target service operation code and the service parameter. Herein, the service operation code and the service operation information are preset in the database, and the parameter information of the first terminal and the service parameter are generated in real time according to the user speech. When a service operation code is set, a corresponding validity period needs to be set for each service operation code. When the service operation code is beyond the validity period, the validity period needs to be reset in the database for the service operation code.

In the foregoing description, the service operation code is preset in the database, and subsequently, the target service operation code corresponding to the target service operation information may be directly found by the first obtaining module 12. Alternatively, after the first obtaining module 12 semantically understands the user speech information and obtains the target service operation information, the first obtaining module 12 randomly generates a random number. If the generated random number is different from all service operation codes existing in the database, the first obtaining module 12 may use the generated random number as a target service operation code, and sets a mapping relationship for the target service operation code, the target service operation information, the parameter information of the first terminal, the service parameter, and the like. In addition, the first obtaining module 12 also sets a validity period for the random number (the target service operation code). Certainly, if the generated random number is the same as a service operation code existing in the database, to ensure uniqueness of the service operation code, the first obtaining module 12 deletes the random number, re-generates a random number, and re-determines whether the re-generated random number is the same as a service operation code existing in the database.

Regardless of whether the service operation code is generated in advance or in real time, the service operation information and an execution page (the execution page is stored by using an HTTP address, and a URL of a resource involved in the page is also stored) corresponding to the service operation information are preset in the database.

The first transmitting module 13 is configured to transmit the target service operation code to the first terminal, so that the first terminal plays the target service operation code by using a speech.

Specifically, the first transmitting module 13 transmits the target service operation code to the first terminal, so that the first terminal encapsulates a preset play prefix and the target service operation code into a speech (referred to as a target speech) based on a preset speech template, and plays the target speech. The target speech may further carry the parameter information of the first terminal.

The search module 14 is configured to receive the target service operation code obtained by a second terminal, search for a target execution page corresponding to the target service operation code, and transmit the target execution page to the second terminal, so that the second terminal executes a service operation corresponding to the target service operation information in the target execution page.

Specifically, the search module 14 receives the target speech collected and transmitted by the second terminal. The second terminal is a screened terminal device with the character input function. The search module 14 converts the target speech into a text, extracts a number in the text, that is, extracts the target service operation code in the text. Alternatively, the search module 14 directly semantically understands the target speech, and extracts the target service operation code in the target speech. Alternatively, the search module 14 receives the target service operation code directly transmitted by the second terminal (that is, the second terminal transmits, to the search module 14, the target service operation code rather than the target speech including the target service operation code). The target service operation code is entered by the user on the second terminal. After obtaining the target service operation code, the search module 14 searches the table in the database for an execution page corresponding to the target service operation code. The execution page corresponding to the target service operation code is referred to as a target execution page. Further, the search module 14 may further verify whether the parameter information of the first terminal in the target speech is the same as the parameter information of the first terminal that is stored and corresponding to the target service operation code. If the two are the same, it indicates that the target speech is valid, and subsequently, the search module 14 may transmit the target execution page to the second terminal (if the two are different, it indicates that the target speech is invalid, and the search module 14 may end a current service operation, and transmit a prompt notification to the user). After receiving the target execution page, the second terminal executes the service operation corresponding to the target service operation information in the target execution page.

Referring to FIG. 5, the first obtaining module 12 may include a first recognition unit 121 and a first search unit 122. As can be appreciated, the modules of the first obtaining module may be implemented by circuitry that performs their corresponding functions.

The first recognition unit 121 is configured to perform a semantic recognition on the user speech information, to obtain the target service operation information corresponding to the user speech information.

The first search unit 122 is configured to search for a service operation code corresponding to the target service operation information, and determine a found service operation code as the target service operation code.

For specific function implementations of the first recognition unit 121 and the first search unit 122, reference may be made to step S101 in the exemplary embodiment corresponding to FIG. 2. Details are not described herein again for the sake of brevity.

Referring to FIG. 5, in addition to the first recognition unit 121 and the first search unit 122, the first obtaining module 12 may further include a second recognition unit 123 and a generation unit 124, which may be implemented by circuitry that performs their corresponding functions.

The second recognition unit 123 is configured to perform a semantic recognition on the user speech information, to obtain the target service operation information corresponding to the user speech information.

The generation unit 124 is configured to generate a random number, determine the random number as the target service operation code in a case that the random number is different from all service operation codes in a database, and set a mapping relationship for the target service operation code and the target service operation information.

For specific function implementations of the second recognition unit 123 and the generation unit 124, reference may be made to step S101 in the exemplary embodiment corresponding to FIG. 2. Details are not described herein again for the sake of brevity.

Referring to FIG. 5, in addition to the first receiving module 11, the first obtaining module 12, the first transmitting module 13, and the search module 14, the service data processing apparatus 1 may further include a setting module 15, which can also be implemented by circuitry that performs the corresponding functions.

The setting module 15 is configured to obtain a plurality of pieces of service operation information and an execution page corresponding to each piece of service operation information, and set a mapping relationship for each piece of service operation information and the execution page corresponding to each piece of service operation information.

For a specific function implementation of the setting module 15, reference may be made to step S101 in the exemplary embodiment corresponding to FIG. 2. Details are not described herein again for the sake of brevity.

Referring to FIG. 5, in addition to the first receiving module 11, the first obtaining module 12, the first transmitting module 13, the search module 14, and the setting module 15, the service data processing apparatus 1 may further include a detection module 16 and a first notification module 17, which can both be implemented by circuitry that performs the corresponding functions.

The detection module 16 is configured to detect the target service operation code obtained by the second terminal.

The first notification module 17 is configured to instruct the search module 14 to search for the target execution page corresponding to the target service operation code in a case that the target service operation code is within a validity period.

The first transmitting module 13 is further configured to transmit a verification failure message to the second terminal in a case that the target service operation code is beyond the validity period.

For specific function implementations of the detection module 16, the first notification module 17, and the first transmitting module 13, reference may be made to step S103 in the exemplary embodiment corresponding to FIG. 2. Details are not described herein again for the sake of brevity.

Referring to FIG. 5, in addition to the first receiving module 11, the first obtaining module 12, the first transmitting module 13, the search module 14, the setting module 15, the detection module 16, and the first notification module 17, the service data processing apparatus 1 may further include a generation module 18 and a second notification module 19, which can both be implemented by circuitry that performs the corresponding functions.

The generation module 18 is configured to receive confirmation speech information collected by the first terminal, and generate a behavior confirmation message according to the confirmation speech information.

The second notification module 19 is configured to instruct the search module 14 to search for the target execution page corresponding to the target service operation code in a case that the behavior confirmation message is the same as a target confirmation message.

The first transmitting module 13 is further configured to transmit a verification failure message to the second terminal in a case that the behavior confirmation message is different from the target confirmation message.

For specific function implementations of the generation module 18, the second notification module 19, and the first transmitting module 13, reference may be made to step S103 in the exemplary embodiment corresponding to FIG. 2. Details are not described herein again for the sake of brevity.

Referring to FIG. 5, in addition to the first receiving module 11, the first obtaining module 12, the first transmitting module 13, the search module 14, the setting module 15, the detection module 16, the first notification module 17, the generation module 18, and the second notification module 19, the service data processing apparatus 1 may further include a second transmitting module 20, which can be implemented by circuitry that performs the corresponding functions.

The first receiving module 11 is further configured to receive a service completion message corresponding to the target service operation information and transmitted by the second terminal.

The second transmitting module 20 is configured to transmit the service completion message to the first terminal, so that the first terminal executes, according to the service completion message, a service operation indicated by the user speech information.

For specific function implementations of the first receiving module 11 and the second transmitting module 20, reference may be made to step S103 in the exemplary embodiment corresponding to FIG. 2. Details are not described herein again for the sake of brevity.

Figure 6:
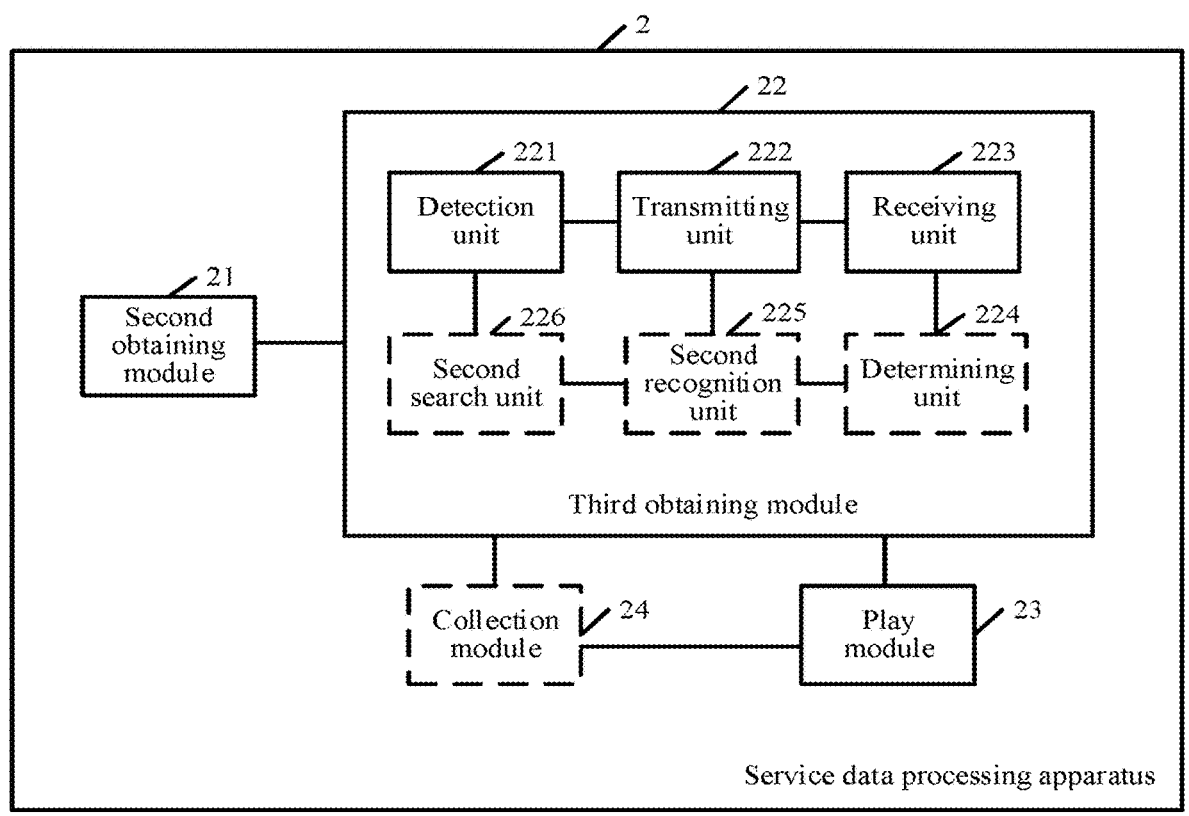
FIG. 6 is a schematic structural diagram of another service data processing apparatus according to exemplary embodiments of the present disclosure.

Further, FIG. 6 is a schematic structural diagram of a service data processing apparatus according to an exemplary embodiment of the present disclosure. The service data processing apparatus 2 may be applied to a first terminal. As shown in FIG. 6, the service data processing apparatus 2 may include a second obtaining module 21, a third obtaining module 22, and a play module 23. As can be appreciated, the modules of the service data processing apparatus 2 may be implemented by circuitry that performs the corresponding functions.

The second obtaining module 21 is configured to obtain user speech information.

The third obtaining module 22 is configured to obtain a target service operation code according to the user speech information, the target service operation code being used for identifying target service operation information.

The play module 23 is configured to play the target service operation code by using a speech, so that a server searches for a target execution page corresponding to the target service operation code and transmits the target execution page to a second terminal, the target service operation code being collected by the second terminal and transmitted to the server, and the target execution page being a page in which the second terminal executes a service operation corresponding to the target service operation information.

For specific function implementations of the second obtaining module 21, the third obtaining module 22, and the play module 23, reference may be made to step S201 and step S202 in the exemplary embodiment corresponding to FIG. 3. Details are not described herein again for the sake of brevity.

Referring to FIG. 6, the third obtaining module 22 may include a detection unit 221, a transmitting unit 222, and a receiving unit 223, all of which may be implemented by circuitry that performs the corresponding functions.

The detection unit 221 is configured to detect a network status according to the user speech information.

The transmitting unit 222 is configured to transmit the user speech information to the server in a case that the first terminal is in a network connected state, so that the server determines the target service operation code according to the user speech information.

The receiving unit 223 is configured to receive the target service operation code transmitted by the server.

For specific function implementations of the detection unit 221, the transmitting unit 222, and the receiving unit 223, reference may be made to step S201 in the exemplary embodiment corresponding to FIG. 3. Details are not described herein again for the sake of brevity.

Referring to FIG. 6, in addition to the detection unit 221, the transmitting unit 222, and the receiving unit 223, the third obtaining module 22 may further include a determining unit 224, which can be implemented by circuitry that performs the corresponding functions.

The determining unit 224 is configured to locally search for a service operation code for network connection as the target service operation code in a case that the first terminal is in a network disconnected state.

For a specific function implementation of the determining unit 224, reference may be made to step S201 in the exemplary embodiment corresponding to FIG. 3. Details are not described herein again for the sake of brevity.

Referring to FIG. 6, in addition to the detection unit 221, the transmitting unit 222, the receiving unit 223, and the determining unit 224, the third obtaining module 22 may further include a second recognition unit 225 and a second search unit 226, which can both be implemented by circuitry that performs the corresponding functions.

The second recognition unit 225 is configured to perform a semantic recognition on the user speech information, to obtain the target service operation information corresponding to the user speech information.

The second search unit 226 is configured to search for a service operation code corresponding to the target service operation information, and determine a found service operation code as the target service operation code.

For specific function implementations of the second recognition unit 225 and the second search unit 226, reference may be made to step S201 in the exemplary embodiment corresponding to FIG. 3. Details are not described herein again for the sake of brevity.

Referring to FIG. 6, in addition to the second obtaining module 21, the third obtaining module 22, and the play module 23, the service data processing apparatus 2 may further include a collection module 24, which can be implemented by circuitry that performs the corresponding functions.

The collection module 24 is configured to collect confirmation speech information, and transmit the confirmation speech information to the server, so that the server generates a behavior confirmation message according to the confirmation speech information, and searches for the target execution page corresponding to the target service operation code according to the behavior confirmation message.

For a specific function implementation of the collection module 24, reference may be made to step S202 in the exemplary embodiment corresponding to FIG. 3. Details are not described herein again for the sake of brevity.

In the exemplary embodiments of the present disclosure, a server receives user speech information collected by a first terminal, and obtains a target service operation code according to the user speech information. The target service operation code is used for identifying target service operation information. The server transmits the target service operation code to the first terminal, so that the first terminal plays the target service operation code by using a speech. The server also receives the target service operation code obtained by a second terminal, searches for a target execution page corresponding to the target service operation code, and transmits the target execution page to the second terminal, so that the second terminal executes a service operation corresponding to the target service operation information in the target execution page. It can be learned from above that, when the second terminal assists the first terminal in completing a service operation, device binding is unnecessary between the first terminal and the second terminal, which can lower a degree of coupling between the first terminal and the second terminal, to improve, by saving a device binding operation, efficiency of the first terminal and the second terminal in completing the service operation. In addition, with the service operation code, the second terminal may directly display the corresponding execution page to the user, so that a user does not need to manually search for the execution page, which further improves the efficiency of the second terminal in completing the service operation.

Figure 7:
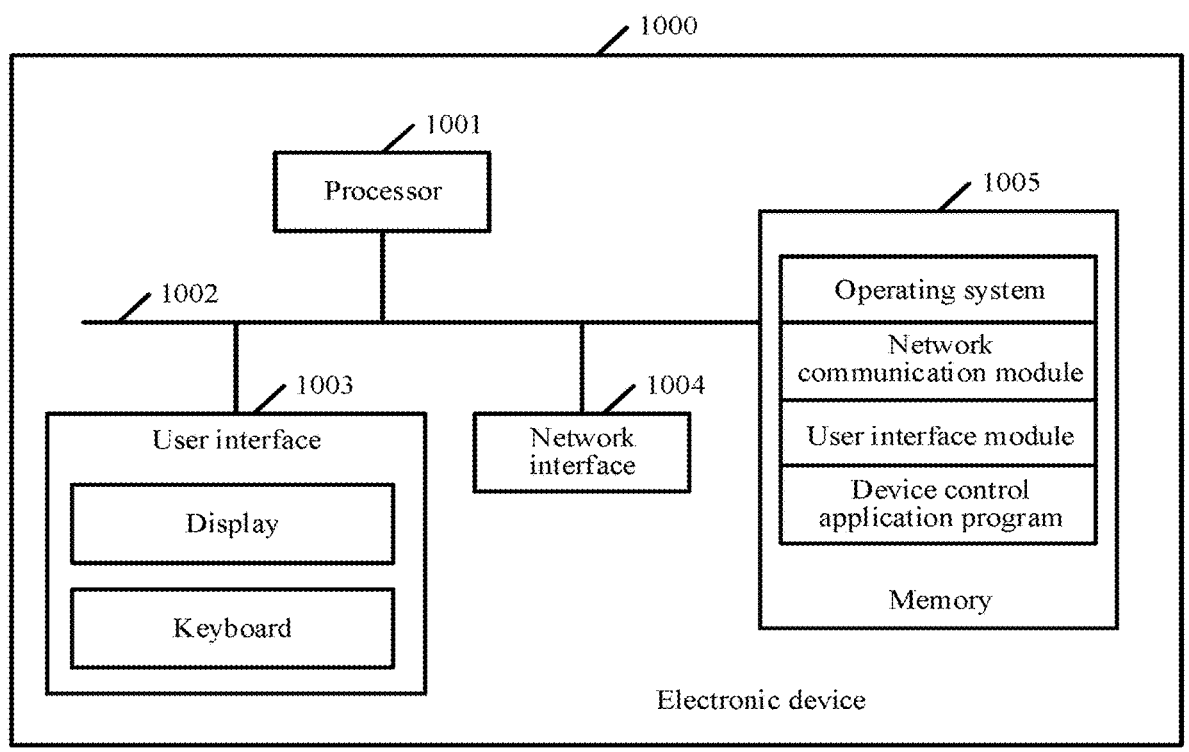
FIG. 7 is a schematic structural diagram of an electronic device according to exemplary embodiments of the present disclosure.

Further, FIG. 7 is a schematic structural diagram of an electronic device according to an exemplary embodiment of the present disclosure. The service data processing apparatus 1 in FIG. 5 may be applied to the electronic device 1000. As shown in FIG. 7, the electronic device 1000 may include circuitry such as a processor 1001, a network interface 1004, and a memory 1005, as well as a user interface 1003 and at least one communication bus 1002. The communication bus 1002 is configured to implement connection and communication between these components. The user interface 1003 may include a display and a keyboard. The user interface 1003 may further include a standard wired interface or wireless interface. The network interface 1004 may include a standard wired interface or wireless interface (for example, a Wi-Fi interface). The memory 1005 may be a high-speed random access memory (RAM), or may be a non-volatile memory, for example, at least one magnetic disk memory. The memory 1005 may alternatively be at least one storage device located away from the processor 1001. As shown in FIG. 7, the memory 1005, as a non-transitory computer storage medium, may include an operating system, a network communication module, a user interface module, and a device control application program.

The electronic device 1000 may be the server in the exemplary embodiment corresponding to FIG. 2. In the electronic device 1000 shown in FIG. 7, the network interface 1004 may provide a network communication function, the user interface 1003 is mainly configured to provide an input interface for a user, and the processor 1001 may be configured to invoke the device control application program stored in the memory 1005 to implement the following steps.

In a first step, user speech information collected by a first terminal is received, and a target service operation code is obtained according to the user speech information. The target service operation code is used for identifying target service operation information.

In a second step, the target service operation code is transmitted to the first terminal, so that the first terminal plays the target service operation code by using a speech.

In a third step, the target service operation code obtained by a second terminal is received, a target execution page corresponding to the target service operation code is identified, and the target execution page is transmitted to the second terminal, so that the second terminal executes a service operation corresponding to the target service operation information in the target execution page.

When obtaining the target service operation code according to the user speech information, the processor 1001 specifically performs the following steps.

In a first step, a semantic recognition on the user speech information is performed to obtain the target service operation information corresponding to the user speech information.

In a second step, a service operation code corresponding to the target service operation information is identified, and a found service operation code is determined as the target service operation code.

When obtaining the target service operation code according to the user speech information, the processor 1001 specifically performs the following steps.

In a first step, a semantic recognition on the user speech information is performed to obtain the target service operation information corresponding to the user speech information.

In a second step, a random number is generated, the random number is determined as the target service operation code in a case that the random number is different from all service operation codes in a database, and a mapping relationship for the target service operation code and the target service operation information is set.

In an exemplary embodiment, the processor 1001 further obtains a plurality of pieces of service operation information and an execution page corresponding to each piece of service operation information, and sets a mapping relationship for each piece of service operation information and the execution page corresponding to each piece of service operation information.

In an exemplary embodiment, the processor 1001 further performs the following steps.

In a first step, the target service operation code obtained by the second terminal is detected.

In a second step, the operation of searching for a target execution page corresponding to the target service operation code is performed in a case that the target service operation code is within a validity period.

In a third step, a verification failure message is transmitted to the second terminal in a case that the target service operation code is beyond the validity period.

In an exemplary embodiment, the processor 1001 further performs the following steps.

In a first step, confirmation speech information collected by the first terminal is received, and a behavior confirmation message is generated according to the confirmation speech information;

In a second step, the operation of searching for a target execution page corresponding to the target service operation code is performed in a case that the behavior confirmation message is the same as a target confirmation message.

In a third step, a verification failure message is transmitted to the second terminal in a case that the behavior confirmation message is different from the target confirmation message.

In an exemplary embodiment, the processor 1001 further performs the following steps.

In a first step, a service completion message corresponding to the target service operation information and transmitted by the second terminal is received.

In a second step, the service completion message is transmitted to the first terminal, so that the first terminal executes, according to the service completion message, a service operation indicated by the user speech information.

It is to be understood that, the electronic device 1000 described in this exemplary embodiment of the present disclosure can implement the descriptions of the service data processing method in the exemplary embodiments corresponding to FIG. 2 to FIG. 4B, and can also implement the descriptions of the service data processing apparatus 1 in the exemplary embodiment corresponding to FIG. 5. Details are not described herein again for the sake of brevity.

In addition, the exemplary embodiments of the present disclosure further provide a non-transitory computer-readable storage medium. The non-transitory computer-readable storage medium stores a computer program executed by the foregoing service data processing apparatus 1. The computer program includes computer-readable instructions that, when executed by the processor, cause the processor to implement the descriptions of the service data processing method in the exemplary embodiments corresponding to FIG. 2 to FIG. 4B. Therefore, details are not described herein again for the sake of brevity as such details are described above with reference to FIG. 2B to FIG. 4B.

Figure 8:
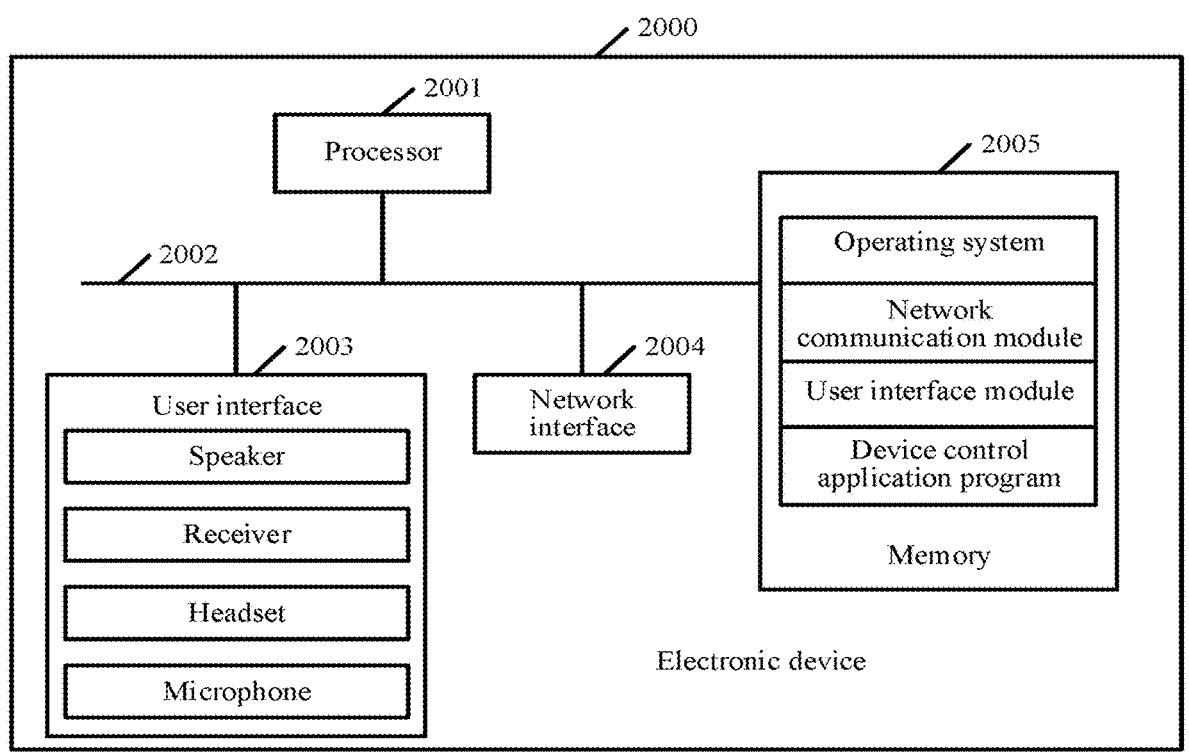
FIG. 8 is a schematic structural diagram of another electronic device according to exemplary embodiments of the present disclosure.

Further, FIG. 8 is a schematic structural diagram of another electronic device according to an exemplary embodiment of the present disclosure. The service data processing apparatus 2 in FIG. 6 may be applied to the electronic device 2000. The electronic device 2000 does not include a display or a keyboard. As shown in FIG. 8, the electronic device 2000 may include circuitry such as a processor 2001, a network interface 2004, and a memory 2005, as well as a user interface 2003 and at least one communication bus 2002. The communication bus 2002 is configured to implement connection and communication between these components. The user interface 2003 may include a speaker, a receiver, a headset, and/or a microphone. The user interface 2003 may encode a speech signal inputted from the component into an electrical signal, or may decode an electrical signal into a speech signal for output from the component. The user interface 2003 may further include a standard wired interface or wireless interface. The network interface 2004 may include a standard wired interface or wireless interface (for example, a Wi-Fi interface). The memory 2005 may be a high-speed RAM, or may be a non-volatile memory, for example, at least one magnetic disk memory. The memory 2005 may alternatively be at least one storage device that is located far away from the processor 2001. As shown in FIG. 8, the memory 2005, as a non-transitory computer-readable storage medium, may include an operating system, a network communication module, a user interface module, and a device control application program.

The electronic device 2000 may be the first terminal in the exemplary embodiment corresponding to FIG. 3. In the electronic device 2000 shown in FIG. 8, the network interface 2004 may provide a network communication function, the user interface 2003 is mainly configured to provide an input interface for a user, and the processor 2001 may be configured to invoke the device control application program stored in the memory 2005 to implement the following steps.

In a first step, user speech information is obtained, and a target service operation code according to the user speech information, the target service operation code being used for identifying target service operation information.

In a second step, the target service operation code is played by using a speech, so that a server searches for a target execution page corresponding to the target service operation code and transmits the target execution page to a second terminal. The target service operation code is collected by the second terminal and transmitted to the server, and the target execution page is a page in which the second terminal executes a service operation corresponding to the target service operation information.

In an exemplary embodiment, when obtaining the target service operation code according to the user speech information, the processor 2001 specifically performs the following steps.

In a first step, a network status is detected according to the user speech information.

In a second step, the user speech information is transmitted to the server in a case that the first terminal is in a network connected state, so that the server determines the target service operation code according to the user speech information.

In a third step, the target service operation code transmitted by the server is received.

In an exemplary embodiment, the processor 2001 further locally searches for a service operation code for network connection as the target service operation code in a case that the first terminal is in a network disconnected state.

In an exemplary embodiment, when obtaining the target service operation code according to the user speech information, the processor 2001 specifically performs the following steps.

In a first step, a semantic recognition is performed on the user speech information, to obtain the target service operation information corresponding to the user speech information.

In a second step, a service operation code corresponding to the target service operation information is found, and the found service operation code is determined as the target service operation code.

In an exemplary embodiment, the processor 2001 further collects confirmation speech information, and transmits the confirmation speech information to the server, so that the server generates a behavior confirmation message according to the confirmation speech information, and searches for the target execution page corresponding to the target service operation code according to the behavior confirmation message.

The electronic device 2000 described in this exemplary embodiment of the present disclosure can implement the service data processing method in the exemplary embodiments corresponding to FIG. 3 to FIG. 4B, and can also implement the service data processing apparatus 2 in the exemplary embodiment corresponding to FIG. 6. Details are not described herein again for the sake of brevity.

In addition, the exemplary embodiments of this application further provide a non-transitory computer-readable storage medium. The non-transitory computer-readable storage medium stores a computer program executed by the foregoing service data processing apparatus 2. The computer program includes computer-readable instructions that, when executed by the processor, cause the processor to implement the service data processing method in the exemplary embodiments corresponding to FIG. 3 to FIG. 4B. Therefore, the details of these exemplary embodiments are not described herein again for the sake of brevity.

A person of ordinary skill in the art will recognize that all or some of the processes of the methods in the foregoing exemplary embodiments may be implemented by a computer program instructing relevant hardware. The program may be stored in a non-transitory computer-readable storage medium. During the execution of the program, processes of the foregoing exemplary method embodiments may be included. The foregoing non-transitory computer-readable storage medium may include a magnetic disk, an optical disc, a read-only memory (ROM), or a RAM.

Numerous modifications and variations of the present disclosure are possible in light of the above teachings. It is therefore to be understood that within the scope of the appended claims, the invention may be practiced otherwise than as specifically described herein.

What is claimed is:

1. A service data processing method, comprising:
   receiving, by circuitry of a server, user speech information collected by a first terminal;
   obtaining, by the circuitry of the server, a target service operation code according to the user speech information, the target service operation code being used for identifying target service operation information;
   transmitting, by the circuitry of the server, the target service operation code to the first terminal, so that the first terminal plays the target service operation code by using a speech;
   receiving, by the circuitry of the server, the target service operation code obtained by a second terminal;
   searching, by the circuitry of the server, for a target execution page corresponding to the target service operation code; and
   transmitting, by the circuitry of the server, the target execution page to the second terminal, so that the second terminal executes a service operation corresponding to the target service operation information in the target execution page.

2. The method according to claim 1, wherein the obtaining a target service operation code according to the user speech information comprises:
   performing, by the circuitry of the server, a semantic recognition on the user speech information, to obtain the target service operation information corresponding to the user speech information; and
   searching, by the circuitry of the server, for a service operation code corresponding to the target service operation information, and determining a found service operation code as the target service operation code.

3. The method according to claim 1, wherein the obtaining a target service operation code according to the user speech information comprises:
performing, by the circuitry of the server, a semantic recognition on the user speech information, to obtain the target service operation information corresponding to the user speech information;
generating, by the circuitry of the server, a random number;
determining, by the circuitry of the server, the random number as the target service operation code in a case that the random number is different from all service operation codes in a database; and
setting, by the circuitry of the server, a mapping relationship for the target service operation code and the target service operation information.

4. The method according to claim 2, further comprising:
obtaining, by the circuitry of the server, a plurality of pieces of service operation information and an execution page corresponding to each piece of service operation information; and
setting, by the circuitry of the server, a mapping relationship for each piece of service operation information and the execution page corresponding to each piece of service operation information.

5. The method according to claim 1, further comprising:
detecting, by the circuitry of the server, the target service operation code obtained by the second terminal;
performing, by the circuitry of the server, the operation of searching for a target execution page corresponding to the target service operation code in a case that the target service operation code is within a validity period; and
transmitting, by the circuitry of the server, a verification failure message to the second terminal in a case that the target service operation code is beyond the validity period.

6. The method according to claim 1, further comprising:
receiving, by the circuitry of the server, confirmation speech information collected by the first terminal;
generating, by the circuitry of the server, a behavior confirmation message according to the confirmation speech information;
performing, by the circuitry of the server, the operation of searching for a target execution page corresponding to the target service operation code in a case that the behavior confirmation message is the same as a target confirmation message; and
transmitting, by the circuitry of the server, a verification failure message to the second terminal in a case that the behavior confirmation message is different from the target confirmation message.

7. The method according to claim 1, further comprising:
receiving, by the circuitry of the server, a service completion message corresponding to the target service operation information and transmitted by the second terminal; and
transmitting, by the circuitry of the server, the service completion message to the first terminal, so that the first terminal executes, according to the service completion message, a service operation indicated by the user speech information.

8. The method according to claim 1, wherein the first terminal is a screenless terminal device or a terminal device without a character input function, and the second terminal is a screened terminal device with the character input function.

9. A non-transitory computer-readable medium storing computer-readable instructions that, when executed by processing circuitry, cause the processing circuitry to perform the method according to claim 1.

10. A service data processing method, comprising:
obtaining, by circuitry of a first terminal, user speech information;
obtaining, by the circuitry of the first terminal, a target service operation code according to the user speech information, the target service operation code being used for identifying target service operation information; and
playing, by the circuitry of the first terminal, the target service operation code by using a speech, so that a server searches for a target execution page corresponding to the target service operation code and transmits the target execution page to a second terminal, the target service operation code being collected by the second terminal and transmitted to the server, and the target execution page being a page in which the second terminal executes a service operation corresponding to the target service operation information.

11. The method according to claim 10, wherein the obtaining a target service operation code according to the user speech information comprises:
detecting, by the circuitry of the first terminal, a network status according to the user speech information;
transmitting, by the circuitry of the first terminal, the user speech information to the server in a case that the first terminal is in a network connected state, so that the server determines the target service operation code according to the user speech information; and
receiving, by the circuitry of the first terminal, the target service operation code transmitted by the server.

12. The method according to claim 11, further comprising:
locally searching, by the circuitry of the first terminal, for a service operation code for network connection as the target service operation code in a case that the first terminal is in a network disconnected state.

13. The method according to claim 10, wherein the obtaining a target service operation code according to the user speech information comprises:
performing, by the circuitry of the first terminal, a semantic recognition on the user speech information, to obtain the target service operation information corresponding to the user speech information; and
searching, by the circuitry of the first terminal, for a service operation code corresponding to the target service operation information, and determining a found service operation code as the target service operation code.

14. The method according to claim 10, further comprising:
collecting, by the circuitry of the first terminal, confirmation speech information; and
transmitting, by the circuitry of the first terminal, the confirmation speech information to the server, so that the server generates a behavior confirmation message according to the confirmation speech information, and searches for the target execution page corresponding to the target service operation code according to the behavior confirmation message.

15. A non-transitory computer-readable medium storing computer-readable instructions that, when executed by processing circuitry, cause the processing circuitry to perform the method according to claim 10.

16. A data processing apparatus, comprising:
circuitry configured to
receive user speech information collected by a first terminal;
obtain a target service operation code according to the user speech information, the target service operation code being used for identifying target service operation information;
transmit the target service operation code to the first terminal, so that the first terminal plays the target service operation code by using a speech; and
receive the target service operation code obtained by a second terminal, search for a target execution page corresponding to the target service operation code, and transmit the target execution page to the second terminal, so that the second terminal executes a service operation corresponding to the target service operation information in the target execution page.

17. The data processing apparatus according to claim 16, wherein to obtain the target server operation code according to the user speech information, the circuitry is further configured to:
perform a semantic recognition on the user speech information, to obtain the target service operation information corresponding to the user speech information; and
search for a service operation code corresponding to the target service operation information, and determining a found service operation code as the target service operation code.

18. The data processing apparatus according to claim 16, wherein to obtain the target server operation code according to the user speech information, the circuitry is further configured to:
perform a semantic recognition on the user speech information, to obtain the target service operation information corresponding to the user speech information;
generate a random number;
determine the random number as the target service operation code in a case that the random number is different from all service operation codes in a database; and
set a mapping relationship for the target service operation code and the target service operation information.

19. The data processing apparatus according to claim 17, wherein the circuitry is further configured to:
obtain a plurality of pieces of service operation information and an execution page corresponding to each piece of service operation information; and
set a mapping relationship for each piece of service operation information and the execution page corresponding to each piece of service operation information.

20. The data processing apparatus according to claim 16, wherein the circuitry is further configured to:
detect the target service operation code obtained by the second terminal;
perform the operation of searching for a target execution page corresponding to the target service operation code in a case that the target service operation code is within a validity period; and
transmit a verification failure message to the second terminal in a case that the target service operation code is beyond the validity period.

* * * * *